(12) United States Patent
Maleki et al.

(10) Patent No.: US 9,403,237 B2
(45) Date of Patent: Aug. 2, 2016

(54) SYSTEMS AND METHODS FOR REMOVING MODE FAMILIES

(71) Applicant: Oewaves, Inc., Pasadena, CA (US)

(72) Inventors: Lute Maleki, Pasadena, CA (US); Andrey Matsko, Pasadena, CA (US); Anatoliy A. Savchenkov, Pasadena, CA (US); Iouri Solomatine, Pasadena, CA (US)

(73) Assignee: Oewaves, Inc., Pasadena, CA (US)

( * ) Notice: Subject to any disclaimer, the term of this patent is extended or adjusted under 35 U.S.C. 154(b) by 0 days.

(21) Appl. No.: 14/206,822

(22) Filed: Mar. 12, 2014

(65) Prior Publication Data

US 2015/0263478 A1 Sep. 17, 2015

(51) Int. Cl.
*B23K 26/364* (2014.01)
*C09K 13/00* (2006.01)
*G02F 1/00* (2006.01)
*H01S 3/00* (2006.01)

(52) U.S. Cl.
CPC ............... *B23K 26/364* (2015.10); *C09K 13/00* (2013.01); *G02F 1/00* (2013.01); *H01S 3/0078* (2013.01); *Y10T 83/0304* (2015.04)

(58) Field of Classification Search
None
See application file for complete search history.

(56) References Cited

U.S. PATENT DOCUMENTS

| | | |
|---|---|---|
| 5,343,490 A | 8/1994 | McCall |
| 5,644,589 A | 7/1997 | Anthon |
| 5,745,511 A | 4/1998 | Leger |
| 6,160,824 A | 12/2000 | Meissner et al. |
| 7,062,126 B2 | 6/2006 | Kersey et al. |
| 7,382,808 B1 * | 6/2008 | Efimov ........................... 372/19 |
| 7,835,610 B2 | 11/2010 | Wu et al. |
| 8,623,951 B2 | 1/2014 | Kambe |
| 2002/0080842 A1 | 6/2002 | An et al. |
| 2003/0147445 A1 | 8/2003 | Zeitner et al. |
| 2009/0154503 A1 | 6/2009 | Peyghambarian et al. |
| 2009/0324168 A1 * | 12/2009 | Hotoleanu et al. .............. 385/28 |
| 2011/0243158 A1 * | 10/2011 | Spiekermann et al. ......... 372/11 |
| 2014/0362878 A1 * | 12/2014 | Voigtlaender et al. ............ 372/6 |

FOREIGN PATENT DOCUMENTS

| | | |
|---|---|---|
| AU | 2012-261826 A1 | 1/2014 |
| EP | 2362502 A2 | 8/2011 |
| WO | 2012154209 | 11/2012 |
| WO | WO 2013045097 A1 * | 4/2013 |

OTHER PUBLICATIONS

Mher Ghulinyan et al: 11 Monolithic Whispering-Gallery Mode Resonators With Vertically Coupled Integrated Bus Waveguides 11, IEEE Photonics Technology Letters, IEEE Service Center, Piscataway, NJ, US, vol. 23, No. 16, Aug. 15, 2011, pp. 1166-1168.
Shaw A et al: 11 Lasing properties of disk microcavity based on a circular Bragg reflector11, Applied Physics Letters, American Institute of Physics, US, vol. 75, No. 20, Nov. 15, 1999, pp. 3051-3053.

* cited by examiner

*Primary Examiner* — Anita Alanko
(74) *Attorney, Agent, or Firm* — Fish & Tsang LLP

(57) ABSTRACT

A monolithic resonator that has a plurality of mode families is modified so that portions of the resonator have a different index of refraction than other portions of the resonator. This degrades the Q factor of one or more of the mode families, allowing pre-selection of one or more mode families over others.

20 Claims, 3 Drawing Sheets

SYSTEMS AND METHODS FOR REMOVING MODE FAMILIES

FIELD OF THE INVENTION

The field of the invention is optic resonators

BACKGROUND

The background description includes information that may be useful in understanding the present invention. It is not an admission that any of the information provided herein is prior art or relevant to the presently claimed invention, or that any publication specifically or implicitly referenced is prior art.

All publications herein are incorporated by reference to the same extent as if each individual publication or patent application were specifically and individually indicated to the incorporated by reference. Where a definition or use of a term in an incorporated reference is inconsistent or contrary to the definition of that term provided herein, the definition of that term provided herein applies and the definition of that term in the reference does not apply.

The materials used in waveguides and resonators have long influenced the type of mode families and the strength of mode families produced by a laser beam. Selecting one or more mode families typically depends on altering a geometry of the materials used. EP2362502 to Rofin, for example, discloses a mode selection technique that allows a mode to be selected by introducing a pit in a surface of a waveguide in the laser. The length of the pit helps to select the lowest order mode when needed. Cutting such a pit, however, requires great precision in the dexterity of the tools involved.

U.S. Pat. No. 5,745,511 to Leger allows a user to select a mode family by first calculating the required mirror reflectance that is needed for that mode family, and then by producing a mirror that has the needed mirror reflectance. Leger's mirror, however, may produce other mode families that are not wanted, and are only accurate to within 50 µm in size. Because Leger depends upon a chemical etching process to produce such mode-selecting mirrors, smaller mirrors for powerful lasers could not be made.

US20030147445 to Zeitner teaches a waveguide resonator that has a waveguide that is thinned near the facets of the waveguide in order to produce phase structures that increase circulating losses for specified modes. Zeitner's method, however, only allows the areas of the waveguide near the facets to be modified, which limits the types of modes that can be eliminated. Zeitner's method also can only be applied to resonators made of a plurality of materials, which tend to have a lower Q factor than monolithic resonators.

US20090154503 to Peyghambarian teaches a method of selecting a mode by using a chemical dopant that absorbs light at some wavelengths, but allows light to pass through at other wavelengths. Preselected mode families will use resonators and waveguides made from dopants that allow only wavelengths capable of producing light within the preselected mode families. There are some mode families, however, that do not have a corresponding dopant that is selective enough to allow only the desired wavelength to pass through the resonator. Under such circumstances, older techniques must be used.

Thus, there remains a need for improved systems and methods for selecting mode families in monolithic resonators.

SUMMARY OF THE INVENTION

The following description includes information that may be useful in understanding the present invention. It is not an admission that any of the information provided herein is prior art or relevant to the presently claimed invention, or that any publication specifically or implicitly referenced is prior art.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

Unless the context dictates the contrary, all ranges set forth herein should be interpreted as being, inclusive of their endpoints, and open-ended ranges should be interpreted to include commercially practical values. Similarly, all lists of values should be considered as inclusive of intermediate values unless the context indicates the contrary.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

The inventive subject matter provides apparatus, systems, and methods in which a monolithic resonator is modified to decrease the Q of one or more mode families of the monolithic resonator. Using this method, one or more mode families could be pre-selected by decreasing the Q of unwanted mode families.

As used herein, "monolithic resonator" is an optical resonator that is made from a single material, such as calcium fluoride, magnesium fluoride, fused silica, silicon nitride, or other type of crystal or glass. Monolithic resonators do not include resonators formed by bonding, a plurality of substrates to a gain medium, as such resonators are made from a plurality of materials. As used herein, an "optical resonator" is a cavity of mirrors that forms a standing, wave cavity resonator for light saves, such as a whispering gallery mode (WGM) resonator, a total internal reflection resonator, and a mirrored lens.

When a continuous wave (cw) light source, such as a laser, is directed into a monolithic resonator, the reflected light in the cavity generally resonates and builds up in intensity within one or more mode families of light frequencies through constructive interference. Since light within those mode families tend to only resonate through certain optical paths through the resonator, if the index, of refraction at any point along that path is altered, the Q of light resonating through that optical path could be degraded. This method works especially well with resonators having mode families having optical paths that do not overlap in space with one another along a surface of the resonator.

Preferably, the Q is degraded by at least two, three, four, or five orders of magnitude so as to render the mode family effectively useless. As used herein, a mode family is "eliminated" when the Q of the mode family is degraded by at least five orders of magnitude. In a preferred embodiment the index of refraction along the optical paths of all mode families but one mode family is altered so as to eliminate all but one of the mode families within the resonator. A system could be used that presents a user interface that allows a user to select the mode family to be selected (effectively selecting all the other mode families to be degraded), or select the mode family for families) to be degraded.

A portion of the resonator could have its index of refraction altered in a plurality of ways. For example, a pit or a resonant cavity could be cut or etched along a surface of the resonator to degrade a mode family that resonates using that surface. As used herein, a "pit" is a recess that is formed along a surface, whereas a "resonant cavity" is an area between two pits that has an altered index of refraction. Such pits could be cut or etched into the surface using a sharp tool, a hot tool, a laser, or a corrosive chemical for example. Contemplated pits are preferably at most 1 or 2 microns, and could be as small as 1 nanometer. Resonant cavities are generally at least 0.5 or 1 micron in width.

When selecting a single mode family, an entire surface could be shaved down to form a protrusion, where the protrusion is the only optical path left that has not been degraded. In other embodiments, one or more locally modified structures could be formed just underneath a surface of the resonator using a femtosecond pulsed laser or an electric discharge to alter the index of refraction. Such locally modified structures could be, for example, voids, implantations, or density shifts in the material. Ion implantation, such as hydrogen ion implantation, could also be used to create locally modified structures under the surface of the resonator.

A high degree of precision is preferred when altering, an index of refraction, especially when working with smaller resonators. Pits and resonant cavities are generally at most 5 microns thick, and are preferably at most 1 micron thick. Voids formed are preferably microscopic, and are at most or 2 microns in diameter. Such voids are also generally placed at most 1, 2, 3, 4, or 5 microns from the surface of the resonator.

Various objects, features, aspects and advantages of the inventive subject matter will become more apparent from the following detailed description of preferred embodiments, along with the accompanying drawing figures in which like numerals represent like components.

One should appreciate that the disclosed techniques provide many advantageous technical effects including pre-selecting one or more mode families of the resonator.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

DETAILED DESCRIPTION

The inventive subject matter provides apparatus, systems, and methods in which a monolithic resonator is modified to degrade a quality of one or more mode families of the resonator.

Figure 1A:
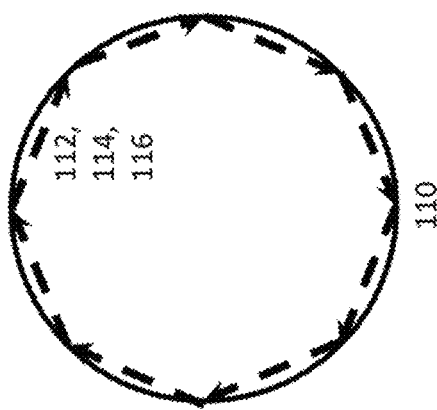
FIG. 1A is a plan view of a WGM resonator.
Figure 1B:
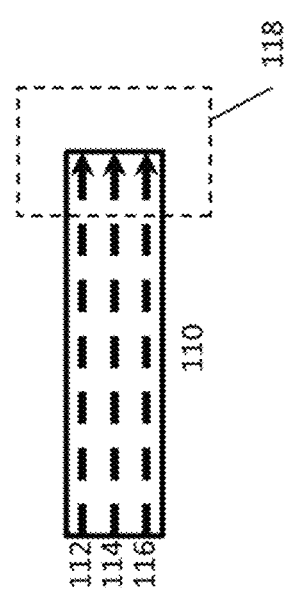
FIG. 1B is a cross-sectional view of the whispering gallery mode resonator of FIG. 1A.

WGM resonators are widely used in nonlinear optics, optomechanics, and microwaves photonics since they enable a significant concentration of continuous wave (cw) light in an optically transparent nonlinear material. Low power external cw pumping of a high-Q WGM resonator results in $GW/cm^2$ intensities of light circulating within the resonator mode volume. In FIGS. 1A and 1B, a WGM resonator 110 is shown having optical paths 112, 114, and 116, respectively, which each represent a mode family. Each of the mode families resonate along an outer circumference of the whispering gallery as shown in FIG. 1A, increasing a Q-factor of a light wave resonating along that path. While each of the mode families, respectively, appear to share the same optical path when viewed in FIG. 1A, FIG. 1B shows that each of the optical paths 112, 114, and 116, respectively, are non-overlapping and are located on above or below one another.

The WGM resonator is generally formed out of a cylindrical perform of any optical transparent material or crystal, such as calcium fluoride, magnesium fluoride, fused silica, silicon nitride, or a sapphire fiber. The cylindrical perform could then be selected with a diameter equivalent, to the desired diameter of the resonator. The location of the optical paths of different mode families could then be determined mathematically or experimentally, and a user interface showing a view similar to that shown in FIG. 1B could be shown to a user that allows the user to select which mode families are to be degraded.

Figure 2A:
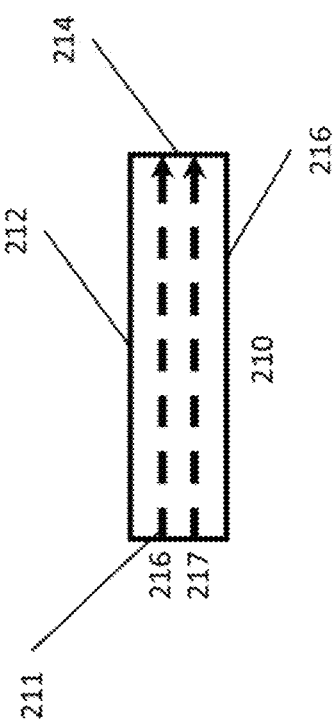
FIG. 2A is a plan view of a total internal reflection resonator.
Figure 2B:
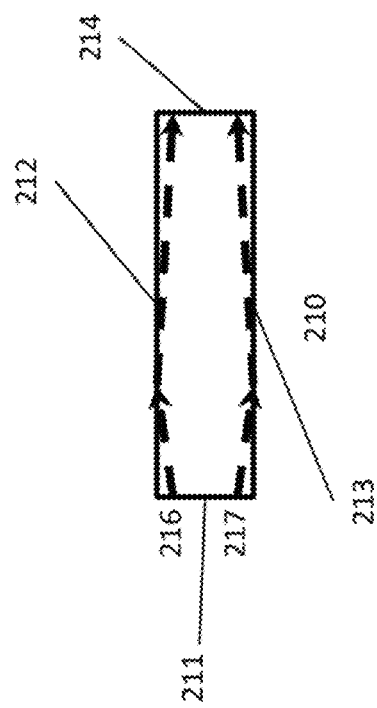
FIG. 2B is a cross-sectional view of the total internal reflection resonator of FIG. 2B.

FIGS. 2A and 2B show an alternative embodiment of a monolithic resonator 210 in the form of a total internal reflection resonator having sides 211, 212, 213, 214, 215, and 216. Sides 211, 212, 213, 214, and 215 are generally treated to be reflective while side 214 is treated to be semi-reflective. Contemplated treatments include coating the surface with dielectric reflective and semi-reflective materials, although such coatings are not required. This ensures that light that enters the monolithic resonator through side 211 will resonate within the cavity increasing the Q-factor of a light wave that resonates through constructive interference before exiting through the semi-reflective surface 214. An optical path 216 of one mode family is shown as reflecting off of wall 212 and an optical path 217 of another mode family is shown as reflecting off of wall 213.

Altering the index of refraction along any of the optical paths 112, 114, 116, 216, or 217 could result in a degradation of the mode family resonating along, that optical path, if many portions of the optical path are degraded sufficiently, the Q-factor of waves within that mode family could be substantially decreased, sometimes by as much as 3-5 orders of magnitude. In order to degrade a quality of optical path 112, for example, the index of refraction of the top portion of resonator 110 shown in FIG. 1B could be altered. Regarding resonator 210, in order to degrade a quality of optical path 216, the index of refraction of the portion of wall 212 where the light reflects off of could be altered.

Figure 3A:
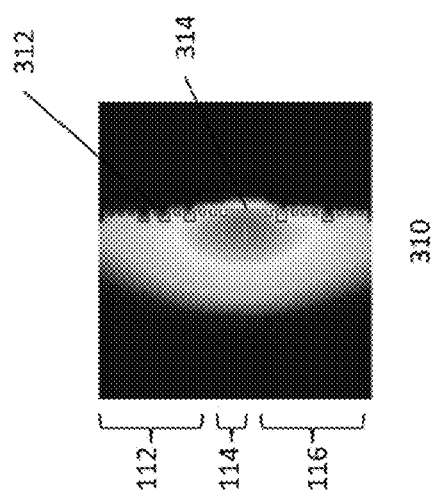
FIG. 3A is a zoomed-in cross-sectional view of a section of a whispering gallery mode resonator modified with cavities.
Figure 3B:
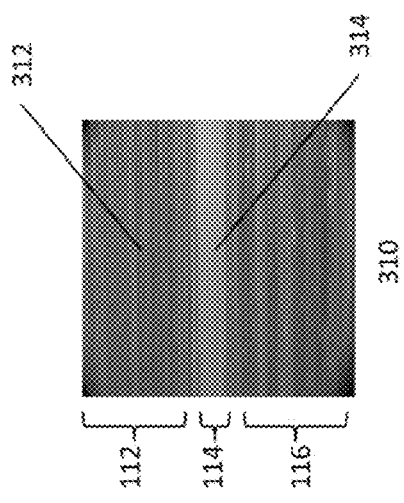
FIG. 3B is a view of the surface of the section showed in FIG. 3A.

As discussed above, the index of refraction of monolithic resonators could be altered in a plurality of ways. In FIGS. 3A and 3B, the portion 118 of WGM resonator 110 has been modified to create resonator 310. Resonator 310 has been created to degrade a quality of optical paths 112 and 116, while keeping the quality of optical path 114 intact. In FIG. 3A, ridges 312 have been formed in a surface of resonator 110 by scoring the surface of the WGM resonator in a plurality of places. This scoring could be performed in a variety of ways, for example by using a sharp tip of a tool or with laser light ablating material as the resonator rotates on a lathe. The sub-wavelength of micro-ridges and micro-trenches is equivalent to the reduction of the refractive index of the material. The surface along optical path 314 is kept smooth to ensure that the quality of light waves within that mode family is orders of magnitude higher than the quality of light waves produced along optical paths 312 and 316, respectively. The smooth and rough surfaces are easier to see in FIG. 3B, which shows how optical path 114 remains smooth along surface 314, unlike surface 312 which has been scored with a plurality of cavities.

Modal characteristics could be designed by adjusting the height of the resonator, the width of the bands containing the ridges, and the thickness and depth of each ridge. The ridges generally produce regions of lower index in the material form from which light from unwanted modes would be scattered. FIG. 3A shows a numerically simulated field distribution of the mode produced along optical path 314. In this embodiment, resonator 310 supports only a single mode, as shown by the field intensity within the volume of the resonator, however it is contemplated that a plurality of modes could be selected. For example, the surface alone optical path 114 could be scored while the surfaces along optical paths 112 and 116, respectively, were untouched. This would create a resonator with two modes preselected, and only one mode degraded.

Figure 4A:
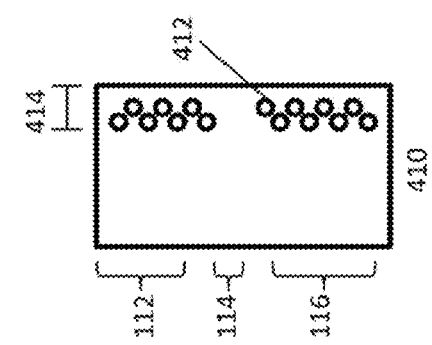
FIG. 4A is a zoomed-in cross-sectional view of a section of a whispering gallery mode resonator modified with voids.
Figure 4B:
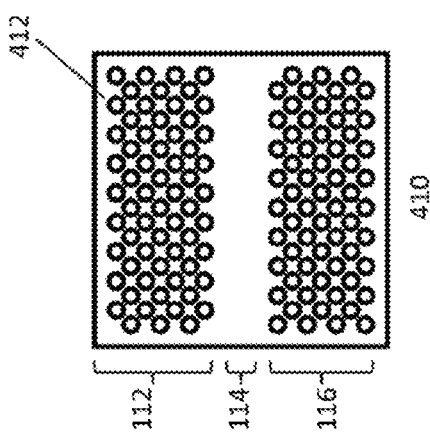
FIG. 4B is a view of the surface of the section showed in FIG. 4A.

FIGS. 4A and 4B show an alternative WGM resonator 410 where locally modified structures 412 have been formed under the surface of the resonator. Such locally modified structures could be a void, a density shift, or an implantation, which could be formed in a variety of ways, such as with the application of a femtosecond pulsed laser to create a pattern of microscopic voids within a crystalline material. This alters the index of refraction where the locally modified structures are created, which could severely degrade the quality of mode families produced in those portions of WGM resonator 410. Ion implantation (such as hydrogen ion implantation) could also be used to penetrate the interior of the material and deposit energy at specific depths. Preferably, the locally modified structures are formed within a specified depth 414, such as 1-2 microns, of the surface of the resonator.

The locally modified structures create a pattern of "spots," such as those shown in FIG. 4B, which are designed to produce the modal spectrum of interest along optical path 114. Since this process does not remove material at a surface of the resonator in the way chiseling or laser ablation would, the integrity of the crystalline structure could be preserved in a better manner. Again, while only one mode is shown as selected, a plurality of modes could be selected without departing from the scope of the invention.

Figure 5:
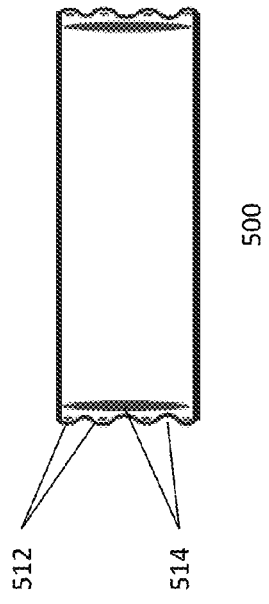
FIG. 5 is a side view of a WGM resonator modified by shaving down two sides of an outer surface of the resonator.

FIG. 5 shows an alternative embodiment where WGM resonator 400 has been modified to degrade a quality of an upper optical path along, surface 414 and surface 416 while leaving the optical path along surface 412 intact. In this embodiment, the field distribution of the mode may not change as significantly as the field distribution shown in FIG. 3A, but the mode families resonating along surfaces 414 and 416 will typically have been degraded by at least 1-2 orders of magnitude.

Figure 6:
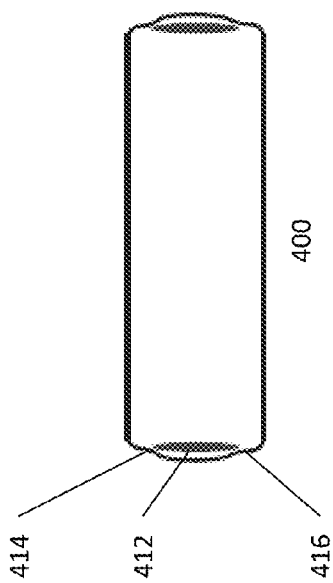
FIG. 6 is a side view of a WGM resonator modified by shaving down a plurality of sections of the outer surface.

FIG. 6 shows another embodiment where WGM resonator 500 has been modified to degrade a quality of a plurality of optical paths 514 while keeping selected optical paths 512 intact. In this embodiment, a plurality of mode families have been selected, creating collective localized states.

Figure 7:
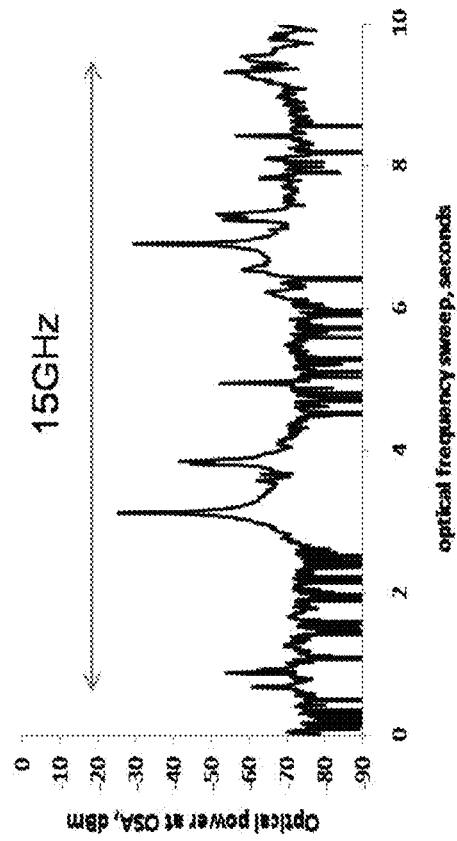
FIG. 7 is an optical spectrum of the resonator of FIG. 3A.

FIG. 7 shows an optical spectrum of resonator 310 shown in FIGS. 3A and 3B. This modal spectrum is virtually limited to a single high Q mode, with a few minor modes with a significantly diminished Q. Difference in Q should be even more dramatic with a high number of voids that are formed under a surface of a WGM resonator.

It should be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed:

1. A method, comprising:
providing a monolithic resonator having a plurality of mode families, wherein the resonator comprises a plurality of spatially distinct portions, wherein the plurality of spatially distinct portions comprises a first portion and a second portion;
altering an index of refraction of the second portion of the resonator in a manner that degrades a quality of at least a first one of the plurality of mode families.

2. The method of claim 1, wherein the monolithic resonator comprises at least one of a whispering gallery mode resonator and a total internal reflection resonator.

3. The method of claim 1, further comprising altering an index of refraction of at least one of the plurality of spatially distinct portions of the resonator in addition to the second portion to eliminate all but one of the plurality of mode families.

4. The method of claim 3, wherein the step of altering the index of refraction of the at least one of the plurality of spatially distinct portions of the resonator in addition to the second portion comprises creating a protrusion in a location of the one of the plurality of mode families.

5. The method of claim 1, wherein none of the plurality of mode families overlap in space with one another.

6. The method of claim 1, further comprising presenting a user interface that allows a user to select the first one of the plurality of mode families to degrade before the step of altering the index of refraction of the second portion of the monolithic resonator.

7. The method of claim 1, wherein the step of altering the index of refraction comprises forming at least one pit along an external surface of the second portion of the monolithic resonator.

8. The method of claim 7, further comprising forming the at least one pit by scratching the second portion of the monolithic resonator with a tool.

9. The method of claim 7, further comprising forming the at least one pit by ablating the second portion of the monolithic resonator with a hot object.

10. The method of claim 7, further comprising forming the at least one cavity by ablating the second portion of the monolithic resonator with a laser beam.

11. The method of claim 7, wherein the cavity is at most one micron wide.

12. The method of claim 1, wherein the step of altering the index of refraction comprises etching the second portion of the monolithic resonator using a corrosive chemical.

13. The method of claim 1, wherein the step of altering the index of refraction comprises forming a locally modified structure underneath a surface of the second portion of the monolithic resonator.

14. The method of claim 13, wherein the locally modified structure is formed using a laser.

15. The method of claim 13, wherein the locally modified structure is formed using an electric discharge.

16. The method of claim 13, wherein the step of altering the index of refraction comprises forming a plurality of voids underneath the surface of the second portion of the monolithic resonator.

17. The method of claim 13, wherein the void is formed using hydrogen ion implantation.

18. The method of claim 13, wherein the void is formed at most 5 microns from a nearest surface of the monolithic resonator.

19. The method of claim 13, wherein the void is formed at most 3 microns from a nearest surface of the monolithic resonator.

20. The method of claim 1, wherein degradation of the quality comprises reducing a quality factor of the first mode by at least three orders of magnitude.

* * * * *